(12) United States Patent
Díaz

(10) Patent No.: US 7,862,950 B2
(45) Date of Patent: Jan. 4, 2011

(54) MEMBRANE ELECTRODE ASSEMBLY

(75) Inventor: Pedro Sánchez Díaz, Albacete (ES)

(73) Assignee: Auto-Juntas, S.A. Unipersonal, Albacete (ES)

( * ) Notice: Subject to any disclaimer, the term of this patent is extended or adjusted under 35 U.S.C. 154(b) by 1302 days.

(21) Appl. No.: 11/279,438

(22) Filed: Apr. 12, 2006

(65) Prior Publication Data

US 2007/0202381 A1  Aug. 30, 2007

(51) Int. Cl.
  *H01M 8/24* (2006.01)

(52) U.S. Cl. .............. 429/460; 429/456; 429/457; 429/458; 429/463; 429/469; 429/508; 429/510; 429/514

(58) Field of Classification Search .............. 429/30, 429/34, 36, 37, 35, 38, 39, 44, 456, 457, 429/458, 460, 463, 469, 508, 510, 514
See application file for complete search history.

(56) References Cited

U.S. PATENT DOCUMENTS

| | | | | |
|---|---|---|---|---|
| 4,440,835 | A * | 4/1984 | Vignaud ............. | 429/42 |
| 5,264,299 | A | 11/1993 | Krasij et al. | |
| 6,057,054 | A | 5/2000 | Barton et al. | |
| 6,423,439 | B1 | 7/2002 | Barton et al. | |
| 6,610,435 | B1 | 8/2003 | Maruyama et al. | |
| 6,815,114 | B1 | 11/2004 | Bronold et al. | |
| 2002/0051902 | A1 | 5/2002 | Suenaga et al. | |
| 2003/0211378 | A1 | 11/2003 | Wald et al. | |
| 2003/0224237 | A1 | 12/2003 | Vanderleeden et al. | |
| 2004/0062958 | A1 * | 4/2004 | Facchi et al. ............. | 429/13 |
| 2004/0191604 | A1 | 9/2004 | Artibise et al. | |
| 2004/0234831 | A1 * | 11/2004 | Kobayashi et al. ......... | 429/30 |
| 2005/0181262 | A1 | 8/2005 | Vanderleeden et al. | |
| 2007/0003821 | A1 * | 1/2007 | Belchuk ................ | 429/44 |

FOREIGN PATENT DOCUMENTS

| | | |
|---|---|---|
| DE | 10028395 | 12/2000 |
| EP | 1018177 | 4/2002 |
| EP | 1241724 | 9/2002 |
| EP | 1156546 | 10/2003 |
| EP | 1372203 | 7/2005 |
| EP | 1693915 | 8/2006 |
| WO | 9900446 | 1/1999 |
| WO | 02065572 | 8/2002 |
| WO | 03096456 | 11/2003 |
| WO | 2004102721 | 11/2004 |
| WO | 2005020356 | 3/2005 |
| WO | 2005029620 | 3/2005 |

* cited by examiner

*Primary Examiner*—Patrick Ryan
*Assistant Examiner*—Ben Lewis
(74) *Attorney, Agent, or Firm*—Tristan A. Fuierer; Moore & Van Allen, PLLC; Andrew D. Gerschutz

(57) ABSTRACT

The present invention relates to an assembly with a reinforced sealing structure for its use in fuel cells and electrolyzers, comprising a membrane electrode assembly (23) and a sealing structure (S) surrounding said membrane electrode assembly (23), said sealing structure (S) comprising a gasket (G), a reinforcing material (4) integrated in said gasket and reagent gas and coolant fluid openings (10) for the passage of reactant gases and coolant fluid.

36 Claims, 5 Drawing Sheets

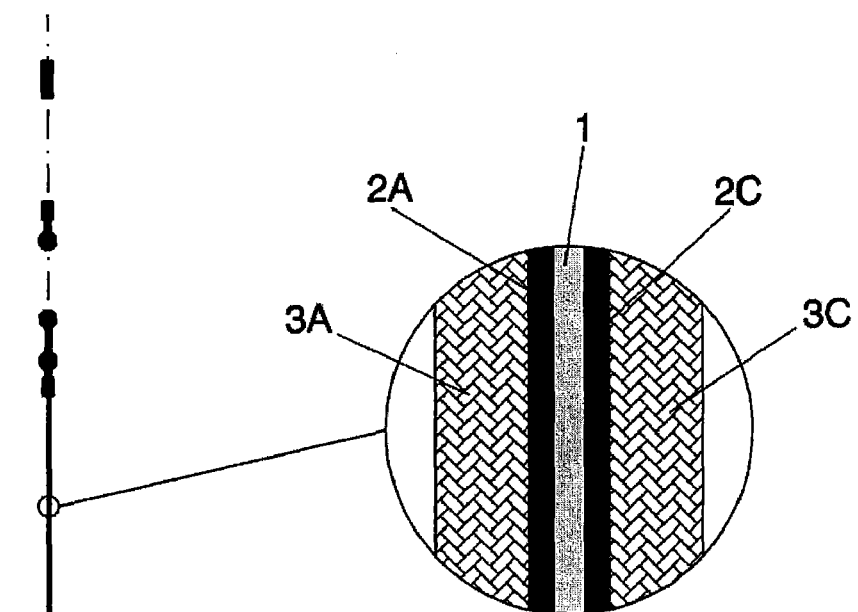
FIG. 3
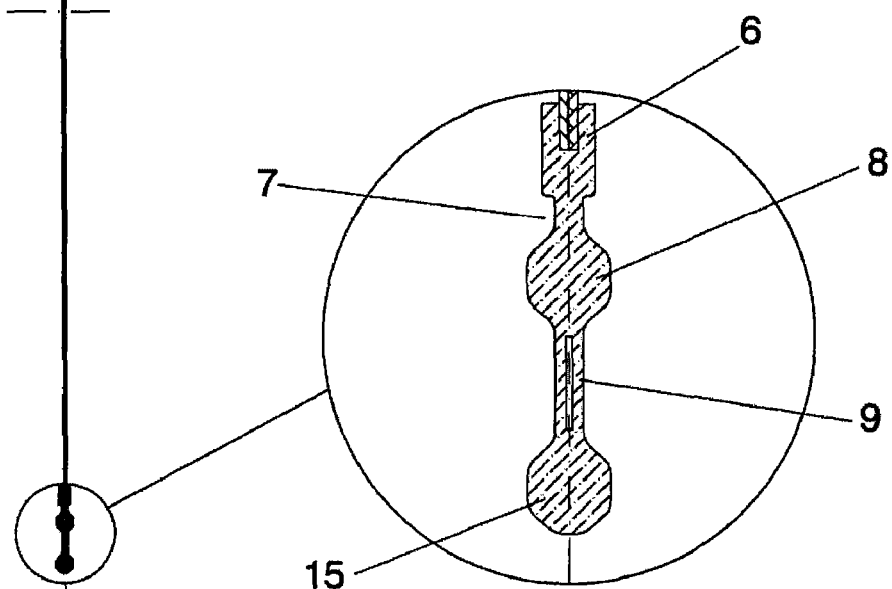
FIG. 4
FIG. 2
A-A'

MEMBRANE ELECTRODE ASSEMBLY

CROSS REFERENCE TO RELATED APPLICATIONS

This application claims priority under 35 U.S.C. §119(a) of European Patent Application No. 06380036.1 for "Membrane Electrode Assembly," filed on Feb. 24, 2006 in the name of Pedro Sanchez Diaz, which is incorporated by reference herein in its entirety.

FIELD OF THE INVENTION

The present invention falls within the scope of fuel cells and electrolyzers, and more specifically it is aimed at an assembly with an improved sealing structure.

STATE OF THE ART

In recent decades there is an important increase in production, storage and energy conversion methods. Due to the progressive depletion of the fossil fuel reserves, such as oil, coal, and natural gas reserves, and due to their negative effects on the environment, new technologies are being developed to generate clean, efficient and decentralized energy. In this sense, fuel cells as a feed system for an electric engine are a very efficient alternative, for example, to using fossil fuels in combustion engines, since they produce clean electric energy with no emission of polluting agents, for which reason both the automotive industry and companies from the electrical and energy sector are interested in them. The fuel cells generate energy by means of the reverse reaction of water electrolysis, using hydrogen and oxygen (taken from air, an alcohol, etc.) as reagents, and releasing only water vapor into the atmosphere. On the other hand, one of the most environment-friendly systems for generating hydrogen is the use of electrolyzers, which are electrochemical devices based on the reverse operation principles of those of fuel cells, and which are formed by a structure that is very similar to the latter.

Amongst the different types of fuel cells currently under development, cells called PEM (Proton Exchange Membrane) fuel cells, or solid polymer electrolyte fuel cells, are the most promising since they provide a high energetic density and they have the advantage of being light and having a small size, as well as working at relatively low temperatures when compared to other fuel cells. The same occurs in the field of electrolyzers, in which those showing the most promising future are those of the PEM type.

This type of fuel cells is formed in general by a set of unit cells. Each one of these cells comprises a membrane electrode assembly, also known as MEA, containing the electrochemically active part, and which is made up of a solid polymer electrolyte membrane arranged between two porous and electrically conductive layers that act as an electrode, where there are arranged a catalyst, and separator plates located on both sides of the MEA, comprising a series of conduits through which the reagent gases flow.

During the operation of a fuel cell the reagent gases must arrive in an effective manner to the catalyst arranged on the electrodes, and for this to occur it is essential to suitably isolate said gases and prevent as much as possible the occurrence of leaks thereof towards other areas of the fuel cell. To this end, in conventional fuel cell structures a series of gaskets are used, located between the MEA and the separator plates, such that they surround the contour of the MEA as well as the passages for the reagent gases. Documents U.S. Pat. No. 5,176,966 and U.S. Pat. No. 5,284,718 disclose some examples. However, these structures force the design of very thin gaskets such as not to increase fuel cell size, which causes a reduction of compression tolerance. On the other hand, since the electrodes are porous, the gasket must be in contact with the membrane and with the separator plates in the sealing areas, and the use of additional layers protecting the membrane is usually necessary. As an additional disadvantage, a large amount of sealing material is wasted during the cutting process.

Some MEAs have been designed as a solution to these problems and integrate the sealing material in their structure (EP 1 018 177, EP 0 604 683, WO2004/102721). This is carried out by injecting a fluid curable sealing material around the edges of the MEA, impregnating at the same time the peripheral pores of the electrode layers on both sides thereof. Thus gas leakages around the edge of the MEA are prevented while at the same time achieving a strong sealing with adjacent separator plates. Additionally, on the outer part of said gaskets sealing elements can be incorporated around the passages for reagent gases by means of suitable molding operations.

However, a problem that occurs with this type of structures is its low dimensional stability since straining usually occurs in the sealing material due to internal stresses and contraction stresses during the injection process. This dimensional stability can further be reduced during fuel cell operation due to expansions or contractions of the MEA.

In this sense, document U.S. Pat. No. 6,610,435 discloses a membrane electrode assembly with an integrated gasket that further incorporates a reinforcement in the manner of a continuous or discrete wire or a rectangular plate, framing the contour of the MEA such as to prevent gasket straining. However, since the passages for reagent gases are integrated in the gasket, these reduce the consistency of the assembly by reducing the capacity of the reinforcement in order to stabilize the MEA body. On the other hand, compression between the stacked elements is reduced by the strain occurring in the sealing material when it is subjected to constant compression and to a high temperature.

In view of the state of the art it is necessary to design membrane electrode assemblies which as well as preventing reagent leakage, provide dimensional stability to the cell assembly preventing straining and reduction of the compression between the stacked elements during fuel cell assembly and operation.

BRIEF DESCRIPTION OF THE INVENTION

The author of the present invention has found, after intensive research, that placing an integrated reinforcing material in the gasket, surrounding both the membrane electrode assembly and the passages for gases, fluids, and, if applicable, clamping elements, allows solving the problems posed in the state of the art, providing a membrane electrode assembly with an improved sealing structure for use in fuel cells and electrolyzers. By using this type of assembly its dimensional stability and reagent gas insulation are considerably improved, and also gasket straining is prevented while at the same time maintaining the compressive force between the elements comprising the fuel cell, which makes the present invention a significant improvement over the membrane electrode assemblies with a sealing structure existing in the state of the art.

Thus, an object of the present invention is an assembly (A) with a reinforced sealing structure comprising a membrane electrode assembly (23) and a sealing structure (S) surrounding said membrane electrode assembly (23), said sealing structure (S) comprising a gasket (G), a reinforcing material (4) integrated on said gasket and reagent gas and coolant fluid openings (10) for the passage of reagent gases and coolant fluid.

In another aspect the invention is aimed at a fuel cell comprising a set of assemblies (A) with a sealing structure such as that defined above.

In a further aspect the invention is aimed at an electrolyzer comprising a set of assemblies (A) with a sealing structure such as that defined above.

In another aspect the invention refers to a process for manufacturing an assembly (A) such as that defined above.

In another aspect the invention refers to the use of an assembly (A) such as that defined above for manufacturing a fuel cell.

In a final aspect the invention is aimed at the use of an assembly (A) such as that defined above for manufacturing an electrolyzer.

DESCRIPTION OF THE DRAWINGS

FIG. 2 shows a section A-A' of the assembly (A) shown in FIG. 1.

FIG. 3 shows a detail X of section A-A' of the assembly in FIG. 2.

FIG. 4 corresponds to a detail Y of the bead sealing element comprised within the gasket covering the outer contour of the membrane electrode assembly (23) of section A-A' of the assembly (A) of FIG. 2.

DETAILED DESCRIPTION OF THE INVENTION

Figure 1:
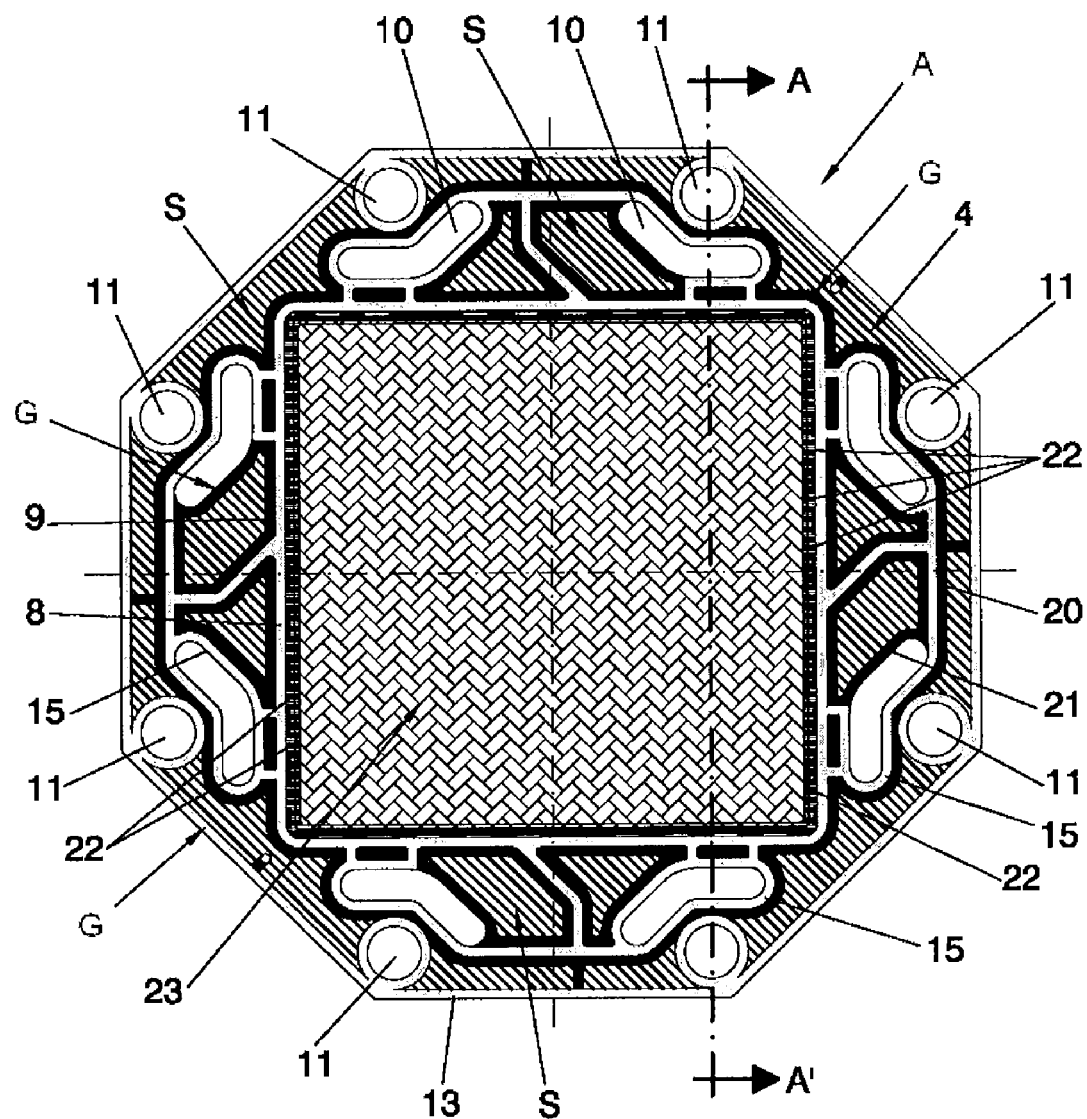
FIG. 1 shows a front view of a membrane electrode assembly (A) according to the present invention with a sealing structure incorporating a reinforcing material with an octagonal design.
Figure 1A:
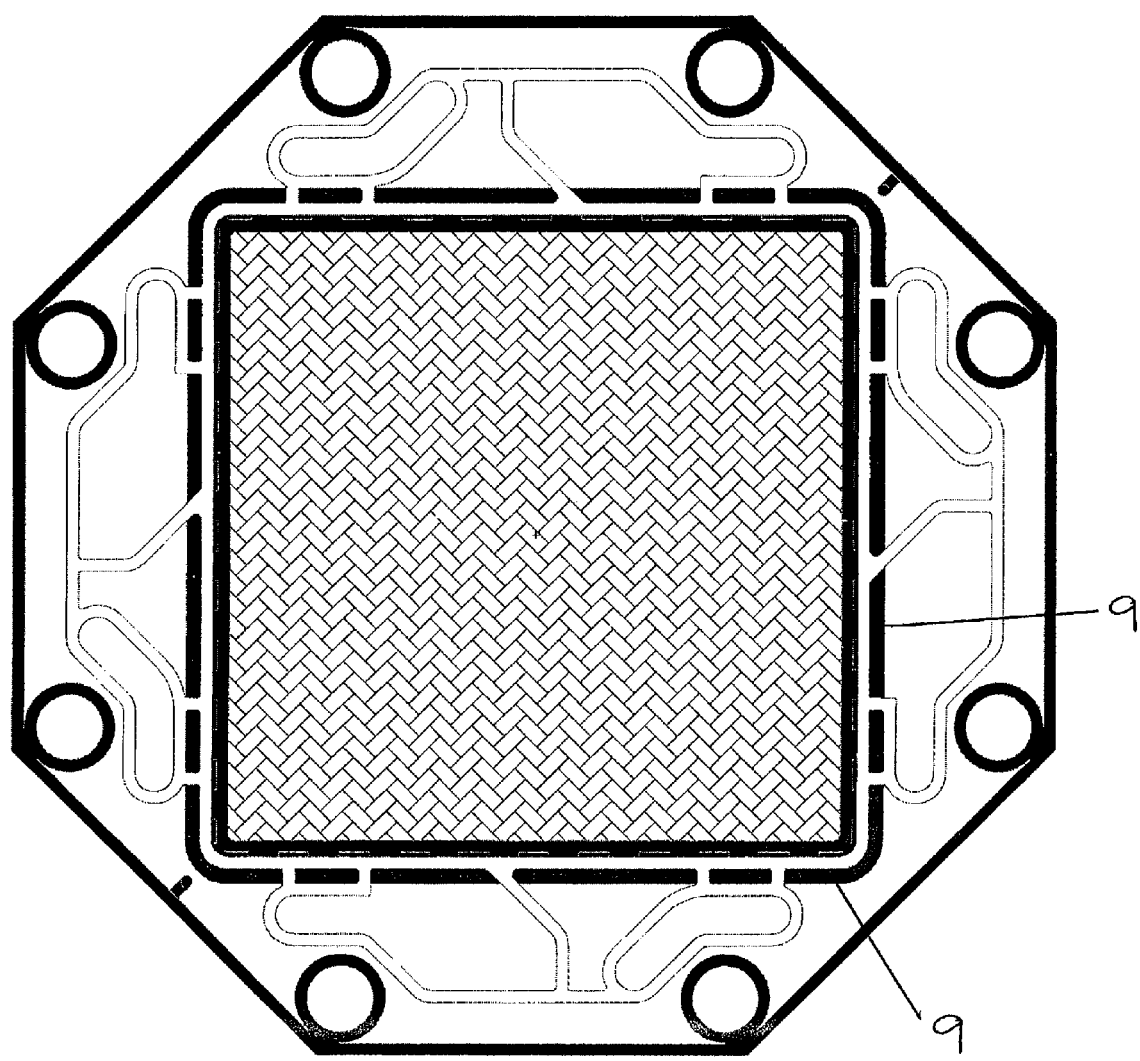
Figure 1B:
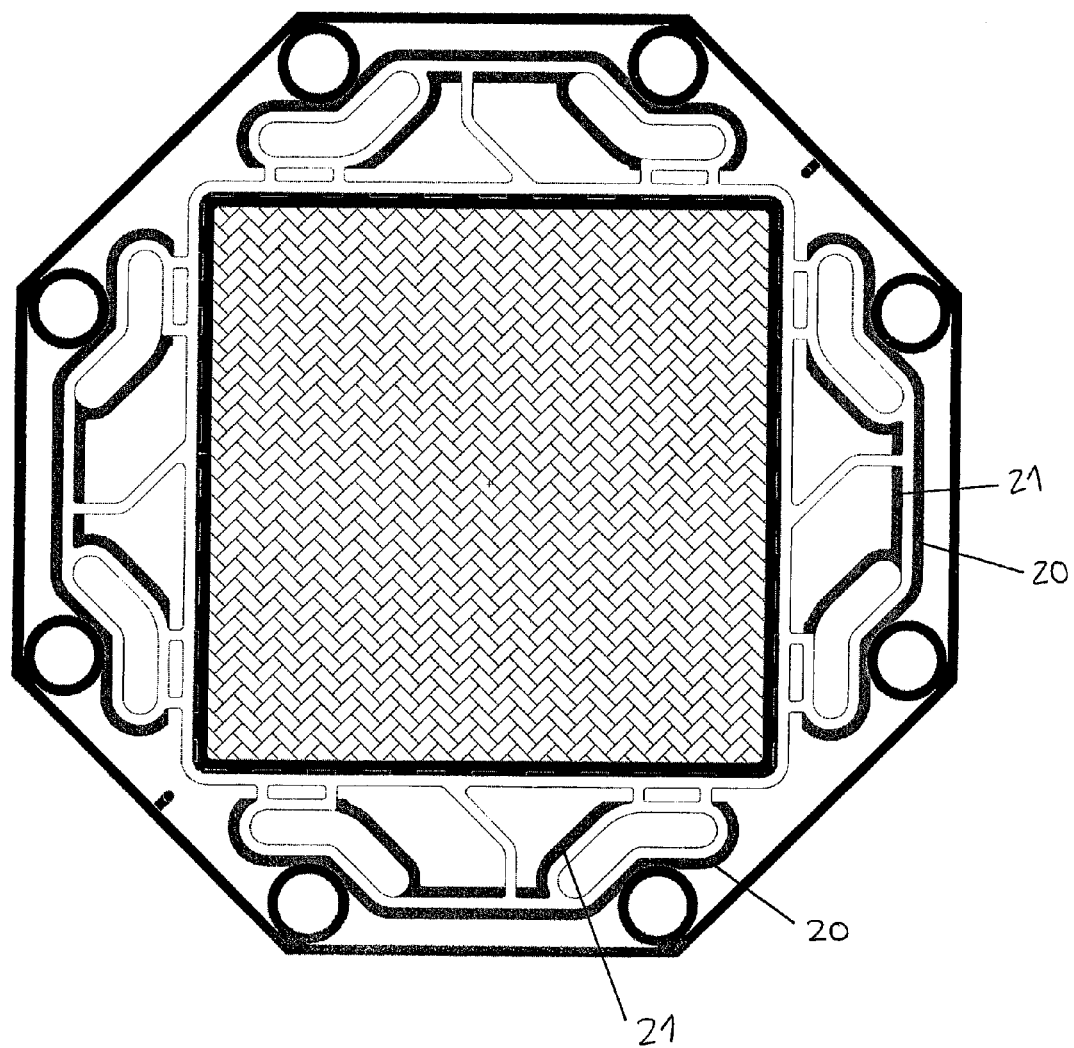

In order to aid the comprehension of the present patent application, the meaning of some of the terms and expressions within the context of the invention is provided below:

The term "assembly (A)" refers to the assembly formed by the membrane electrode assembly (23) and the reinforced sealing structure (S), the latter comprising a gasket (G), a reinforcing material (4) and reagent gas and coolant fluid openings (10) for the passage of reagent gases and coolant fluid.

The term "membrane electrode assembly (23)" refers to the assembly formed by the ion exchange membrane (1), the anode (3A) and cathode (3C) porous gas diffusion layers and the electrochemical catalyst layers (2A, 2B).

The term "bead sealing element" refers to a continuous portion of polymeric material that projects with respect to the surface formed by the membrane electrode assembly (23) and with respect to the surface of the reinforcing material (4) coated with polymeric material or without coating, and it can comprise different areas with different thicknesses depending on whether it acts as a sealing element of the assembly (A), as a regulator of the thickness of the assembly (A) or as an attachment element of the membrane electrode assembly (23) and the reinforcing material (4).

One aspect of the present invention is an assembly (A) with a reinforced sealing structure comprising:
a) a membrane electrode assembly (23) having an outer contour;
b) a sealing structure (S) surrounding said membrane electrode assembly (23), comprising:

i) a gasket (G) completely covering the outer contour of the membrane electrode assembly (23) and extended until covering the outer contour of the assembly (A);
ii) a reinforcing material (4) integrated in said gasket (G) that extends from the outer contour of the membrane electrode assembly (23) to the outer contour of the assembly (A); and
iii) reagent gas and coolant fluid openings (10) for the passage of reagent gases and coolant fluid.

FIG. 1 and FIG. 2 correspond to a front view and the A-A' cross section, respectively, of an assembly (A) with a reinforced sealing structure representative of the present invention and, particularly, with an octagonal geometry. The square-shaped central portion corresponds to the membrane electrode assembly (23). Surrounding said membrane electrode assembly (23) is a sealing structure (S) comprising, in turn, a gasket (G), a reinforcing material (4) integrated in said gasket (G) and reagent gas and coolant fluid openings (10) for the passage of reagent gases and coolant fluid, some of them corresponding to inlet passages and others to outlet passages of said gases and coolant fluid.

Optionally, the sealing structure (S) further comprises at least one first opening (11) for the passage of clamping elements. It should be mentioned that when the assembly does not have said first opening(s) (11) for the passage of the clamping elements it is because such elements are located in an area that is outside the set of assemblies (A) that make up the fuel cell.

The membrane electrode assembly (23) is the central element of proton exchange membrane fuel cells, and the place where the electrochemical reaction takes place. In said reaction the combustible gas, generally rich in hydrogen, oxidizes in the anode electrode, and for its part the oxidizing gas, usually oxygen from the air, is reduced in the cathode electrode. In hydrogen oxidation electrons are released which form an electronic current circulating from anode to cathode through an electrical circuit outside the membrane electrode assembly.

Said membrane electrode assembly (23) can comprise the following elements:
a) a cathode porous gas diffusion layer (3C);
b) an anode porous gas diffusion layer (3A);
c) an ion exchange membrane (1) interposed between the cathode porous gas diffusion layer (3C) and the anode porous gas diffusion layer (3A);
d) an anode electrocatalyst layer (2A) arranged in the interface between said membrane (1) and said anode porous gas diffusion layer (3A); and
e) a cathode electrocatalyst layer (2C) arranged in the interface between said membrane (1) and said cathode gas diffusion layer (3C);
wherein said electrocatalyst layers (2A, 2C) defining an electrochemically active area.

FIG. 3 shows a detail X of the membrane electrode assembly (23) of the A-A' cross section of FIG. 2. Said membrane electrode assembly (23) comprises an ion exchange membrane (1) also called a proton conducting membrane, that acts as a solid electrolyte. In the present invention, any suitable solid polymer electrolyte membrane may be used, such as, for example, membranes made up of fluoropolymers with functional groups of sulfonic acids or other types free of fluoride, such as aromatic carboxylic acids, polybenzimidazoles, polyketones, polysulfones, polymides, and other composite derivatives thereof. In a preferred embodiment, the membrane is made up of a fluoropolymer comprising tetrafluoroethylene copolymers and one or more fluorinated comonomers with sulfonic acid functional groups, commonly known as PFSA (perfluorinated sulfonic acids), such as those commercially known as Nafion® (DuPont Chemicals, Wilmington Del.) or Flemion® (Asahi Glass Co. Ltd., Tokyo, JP), the use of Nafion® being more preferred. On the other hand, the thickness of the polymeric membrane can be comprised between 1 μm and 300 μm, preferably between 10 μm and 100 μm.

One of the sides of the polymeric membrane (1) is in contact with the anode porous gas diffusion layer (3A) and the other side with the cathode porous gas diffusion layer (3C). Each one of the porous gas diffusion layers (3A, 3C) includes an electrochemical catalyst (2A, 2C) arranged in the interface formed by the gas diffusion layers (3A, 3C) and the membrane (1). Said anode and cathode gas diffusion layers (3A, 3C) are formed by a porous material which may contain at least one microporous layer that is located on the side in contact with the membrane (1). By acting as gas diffusion layers they allow the passage of reagent gases to the catalyst so that the electrochemical reaction may occur. The anode porous gas diffusion layer (3A) and the anode catalytic layer (2A) form the anode electrode, called the anode gas diffusion electrode. The cathode porous gas diffusion layer (3C) and the cathode catalytic layer (2C) form the cathode electrode, called the cathode gas diffusion electrode. For the assembly described in the present invention any type of gas diffusion layer that a person skilled in the art considers suitable may be used, however, in a preferred aspect, the electrode layers are formed by a material comprising carbon fibers, such as carbon cloth and carbon paper. Some examples of these materials are Toray® Carbon Paper, SpectraCarb® Carbon Paper, AFN® non-woven carbon cloth, Zoltek® Carbon Cloth, and the like. In a preferred embodiment ELAT® GDL carbon cloth with a microporous layer is used.

The porous gas diffusion layers (3A, 3C) may be coated or impregnated with other materials, including for example coating with carbon particles or by means of hydrophobing treatments such as coating with polytetrafluorethylene (PTFE).

The design of the membrane electrode assembly (23) is such that the porous gas diffusion layers (3A, 3C) and the ion exchange membrane (1) have the same dimensions.

As regards the catalyst (2A, 2C), any can be used that is considered suitable by a person skilled in the art. However, the use of carbon supported metal catalyst particles is considered more suitable. This type of structures comprises 20-95% by weight of carbon and 5-80% by weight of metal catalyst. Said metal catalyst is formed by a precious metal that may be mixed with other metals, precious or not, being able to form binary and even tertiary combinations, platinum or the mixture of platinum and ruthenium at a suitable ratio being preferred. The same catalyst may be used for the anode and cathode or a different catalyst may be used for each one of them. Thus, for example, in a fuel cell fed with hydrogen coming from reformed gas, which may contain a substantial proportion of CO, the use of platinum for the cathode and platinum-ruthenium at a 2:1 ratio for the anode would be preferred. However, in a fuel cell fed with industrial grade hydrogen, the use of platinum as a catalyst in both electrodes would be preferred.

In general, the catalyst (2A, 2C) is applied on the porous gas diffusion layers (3A, 3C) as an ink. Said ink comprises a suspension of catalytic particles dispersed in an electrolyte, which in general is the same one that forms the ion exchange membrane. Said suspension is an aqueous suspension additionally comprising alcohols, such as isopropanol and ethanol, or polyalcohols, such as glycerin and ethylene glycol. In a preferred embodiment of the invention, the catalytic ink is an aqueous suspension of carbon supported platinum particles with liquid Nafion® and isopropanol.

As regards the sealing structure (S) that makes up the assembly (A), it comprises a sealing gasket (G) the main function of which is to prevent the mixture of reagent gases at each side of the membrane electrode assembly (23), to insulate the reagent gas openings (10) intended for the passage of said gases and preventing the leakage thereof to the exterior. Said sealing gasket completely covers the outer contour of the membrane electrode assembly (23), impregnating the pores of the outer edge of the porous gas diffusion layers (3A, 3C) on both sides of the assembly, and it extends until covering the outer contour of the assembly (A).

In a particular embodiment of the present invention, said gasket includes at least one bead sealing element which covers the outer contour of the membrane electrode assembly (23), surrounds the reagent gas and coolant fluid openings (10) for the passage of reagent gases and coolant fluid, and/or covers the outer contour of the assembly (A). Likewise, when the sealing reinforcement structure has at least one first opening (11) for the passage of clamping elements, the gasket further comprises a bead sealing element surrounding said at least first opening (11).

In this sense, FIG. 4 shows a detail Y of the assembly cross section appearing in cross section A-A' of FIG. 2. In this detail a representative, although not limiting, bead sealing element of the gasket (G) can be seen which covers the outer contour of the membrane electrode assembly (23). Said bead sealing element comprises a first attachment area (6) wherein the sealing material forming the bead sealing element enters the pores of the outer contour of the membrane electrode assembly (23), specifically enters the porous of the gas diffusion layers (3A, 3C). This last feature is essential in order to prevent reagent gas leakage, and it further prevents the electrochemical reaction in that portion. The thickness of the first attachment area (6) of the bead sealing element is preferably in a range from 0.4 mm to 3 mm, more preferably from 0.8 mm to 1.3 mm. Although this area does not act as a gasket itself, it strengthens the union between the gasket and the membrane electrode assembly (23) and further serves to limit, if necessary, sealing bead compression during fuel cell stacking.

Adjacent to this first attachment area (6) there is a stress dampening area (7) wherein the sealing material forming the bead sealing element has a thickness that is less than that of the first attachment area. Said thickness is selected such that there is a space between this area and the adjacent separator plates when the assembly is compressed when the fuel cell is stacked. The thickness of this stress dampening area (7) of the bead sealing element is preferably in a range form 0.2 mm to 2 mm, more preferably from 0.3 mm to 0.8 mm. In this manner, in the event that the assembly is compressed beyond normal thickness and the first attachment area (6) is strained, the latter has a free space around it through which it can flow.

Adjacent to the stress dampening area (7) there is a first sealing area (8) wherein the sealing material forming the bead sealing element has a thickness that is greater than that of the first attachment area (6), being the area which really acts as a sealing element of the gasket, preventing the mixture of the reagent gases on both sides of the membrane electrode assembly (23) and the leakage thereof to the exterior. This first sealing area is subjected to significant compression during fuel cell assembly. An attempt is made to have a duplicate sealing area, insofar as this is possible, in order to improve the sealing of said reagent gases. The thickness of this first sealing area (8) of the bead sealing element is preferably in a range from 0.8 mm to 5 mm, more preferably from 1 mm to 2.4 mm.

Following the first sealing area (8) there is a second attachment area (9) wherein the sealing material forming the bead sealing element envelops the reinforcing material and has a thickness that is less than that of the first sealing area (8). In this area (9) the material forming the bead sealing element is strongly attached to the reinforcing material (4), which contributes to the dimensional stability of the assembly. The thickness of this second attachment area (9) of the bead sealing element is in a range from 0.2 mm to 2 mm, more preferably from 0.3 mm to 0.8 mm.

Likewise, the bead sealing element covering the outer contour of the membrane electrode assembly (23) can optionally comprise a series of notches (22) which facilitate the flow of the sealing material to the first attachment area (6) in which the gasket attaches to the membrane electrode assembly (23), in order to obtain a controlled distribution of the sealing material in the gasket.

Within the same particular embodiment, the bead sealing element surrounding the reagent gas and coolant fluid openings (10) for the passage of reagent gases and coolant fluid is shown in FIG. 1. It comprises in their structure a third attachment area (20, 21) wherein the sealing material forming the bead sealing element is attached to the reinforcing material (4), and also a second sealing area (15) adjacent to the third attachment area, wherein the sealing material forming the bead sealing element has a thickness that is greater than that of the third attachment area (20, 21). As well as attaching the reinforcing material (4), the third attachment area (20, 21) allows it not to become deteriorated due to the humid and acid environment it may be subjected to in its most critical portion, such as the cutting area of the reinforcing material, and it also prevents possible cuts during handling in manufacturing processes. The thickness of the third attachment area (20, 21) of the bead sealing element is in a range from 0.2 mm to 2 mm, more preferably between 0.3 mm and 0.8 mm. The second sealing area is the area that acts, together with the first sealing area (8), as a sealing element of the gasket, insulating the reagent gas and coolant fluid openings (10) for the passage of said gases and coolant fluid, preventing the leakage thereof. The thickness of said second sealing area (15) of the bead sealing element is preferably in a range from 0.8 mm to 5 mm, more preferably from 1 mm to 2.4 mm.

When the assembly comprises at least one opening (11) intended for the passage of clamping elements, the gasket further comprises a bead sealing element surrounding said opening(s) (11). Said bead sealing element has a thickness preferably in a range from 0.4 mm to 3 mm, more preferably from 0.8 mm to 1.3 mm and has as a function, amongst others, protecting the passage of clamping elements.

Lastly, and still within the same particular embodiment, the gasket (G) comprises a bead sealing element (13) covering the outer contour of the assembly (A) of the invention. Said bead sealing element, just as, in its case, the one surrounding the opening(s) (11) intended for the passage of clamping elements, has a thickness preferably in a range from 0.4 mm to 3 mm, more preferably from 0.8 mm to 1.3 mm, and also corresponds with the thickness of the first attachment area (6) where the gasket attaches to the membrane electrode assembly (23), thereby also regulating the thickness of the assembly in fuel cell assembly, functioning as a stop. In fact, it is essential to achieve suitable thickness when performing the assembly since the membrane electrode assembly (23) compression depends on it, directly influencing its electrochemical performance. This bead further prevents the deterioration of the reinforcement (4), preventing its oxidation in the case of it being metallic, as well as being a safety element which prevents that the reinforcing material (4) cuts or injures operators.

The sealing material forming the gasket (G) is a polymeric material which may contain different additives and fillers to facilitate its processing and improve the chemical resistance and mechanical features thereof. Said polymeric material is an elastomer selected from nitrile rubbers, polyacrylic rubbers, fluorinated rubbers, silicone rubbers, silicones and liquid silicones, although it is not limited exclusively to these materials. In a preferred embodiment the sealing material is nitrile rubber or silicone rubber.

Thanks to the integration of this gasket (G) in the sealing structure (S) of the assembly (A) it is possible to seal the fuel cell by applying low tightening torques to the elements intended to that effect, due to the sealing area being reduced to the contact surfaces of the bead sealing element(s) with the separator plates. The low tightening torque applied prevents stressing between the different elements of the fuel cell, improving the alignment thereof. This is a great advantage in the case of fuel cells with a large number of unit cells, since it prevents negative effects, such as twisting of the fuel cell assembly, from occurring when the tightening is applied. The amount of sealing material is also minimized, since not all the sealing structure (S) is coated in said material. On the other hand, the use of the bead sealing element(s) allows obtaining a very efficient sealing contributing towards a very significant reduction of reagent gas leakage.

Figure 5:
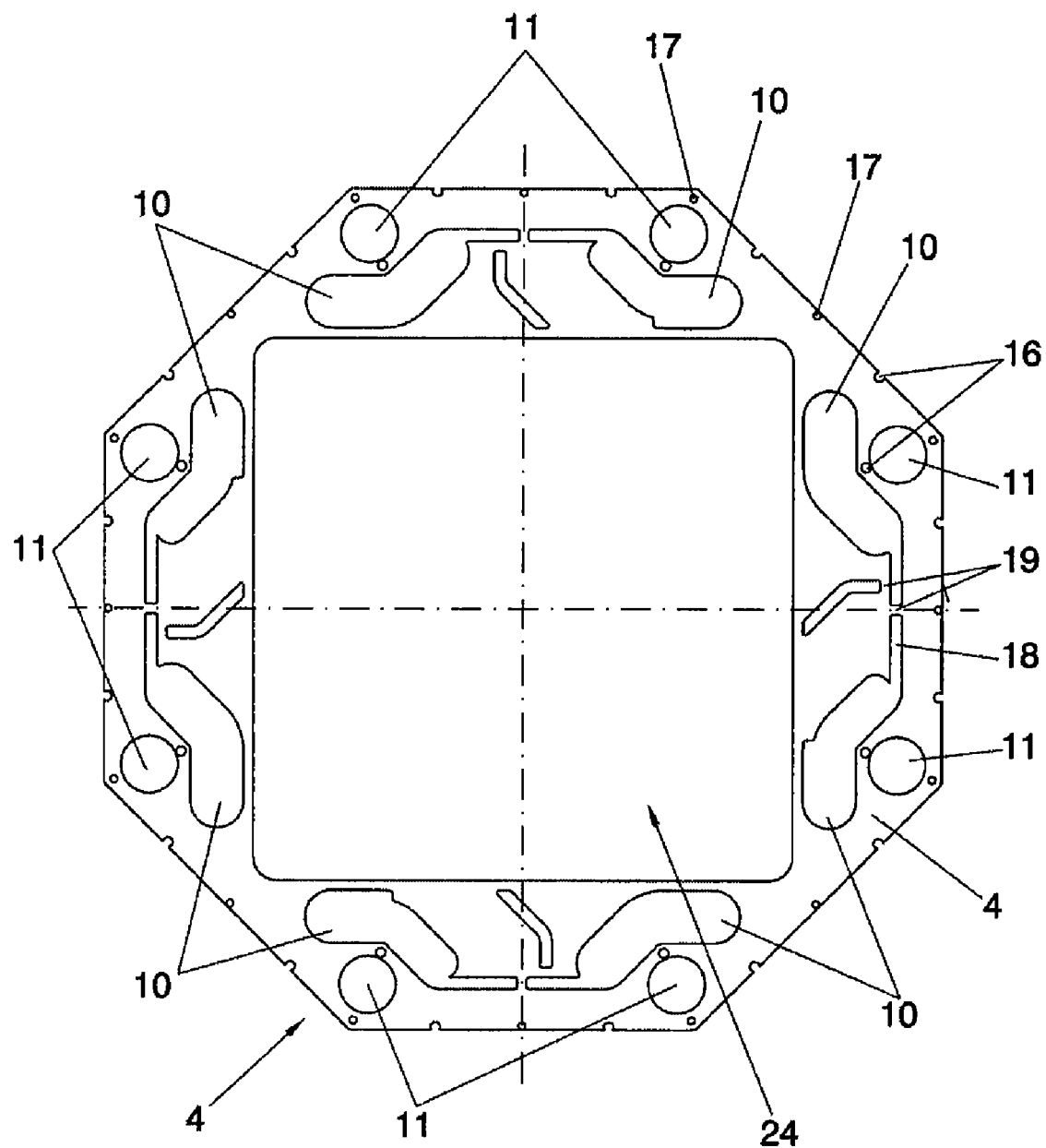
FIG. 5 shows a front view of a reinforcing material (4) with an octagonal design according to the present invention.

As regards the reinforcing material (4), it is integrated in the gasket, particularly between the bead sealing element which covers the outer contour of the membrane electrode assembly (23) and the bead sealing element which covers the outer contour of the assembly (A). Said reinforcing material is formed by a sheet surrounding the membrane electrode assembly (23). FIG. 5 shows a front view of a reinforcing material with an octagonal design which is representative, but not limiting, of the present invention. In a particular embodiment, said reinforcing material comprises a central cavity (24) for positioning the membrane electrode assembly (23) and a series of reagent gas and cooling fluid openings (10) for the passage of reagent gases and coolant fluid. Likewise, it can additionally comprise at least one second opening (16, 17) for the passage of the sealing material on both sides of the assembly during its injection process. The opening(s) (16), of a greater diameter than the opening(s) of type (17), correspond with the injection points located in the mold for the molding process. The reinforcing material (4) can also have at least one hollow area (18) for placing part of the bead sealing element(s) in the gasket. Furthermore, with the aim of providing solidity to the reinforcing material, it can comprise at least one bridge (19) located between the hollow area(s) in which part of the bead sealing element(s) are located.

When the sealing structure (S) has at least one first opening (11) for the passage of clamping elements, the reinforcing material (4) therefore further comprises at least one first opening (1) for the passage of said clamping elements.

In a particular embodiment, the thickness of the reinforcing material (4) is in a range from 0.05 mm to 1 mm. Greater thicknesses would not be suitable because they would unnecessarily increase the size and weight of the fuel cell, and smaller thicknesses would provide little rigidity to the assembly it forms together with the membrane electrode assembly (23). In a preferred embodiment, said thickness is in a range from 0.10 mm to 0.50 mm.

As a material forming the reinforcement, any material with sufficient stiffness and dimensional stability, as well as resistance to corrosive environments, can be used. For example, polymeric materials, such as composites with glass fiber, composites with boron fiber, composites with aramid fiber, phenolic resins or polycarbonates, or metallic materials, preferably stainless, such as stainless steels, with or without coatings may be used. In a preferred embodiment of the invention the material is a stainless spring steel, which is a tempered steel providing better rigidity and resistance to plastic straining than conventional steel, such that it further contributes towards improving the tightening resistance in the cell assembly.

In a particular embodiment of the invention, at least one of the front sides of the reinforcing material (4) is completely coated with the sealing material forming the gasket, with a thickness equal to that of elements (9), (20) and (21). This embodiment has the advantage of improving the chemical protection of the reinforcing element (4).

Integration of this reinforcing material (4) in the structure of the assembly (A) makes it easier to handle for its processing and manufacture, as well as allowing an easy assembly of the different elements when forming the fuel cell.

As an additional advantage, during the injection, handling, assembly and storage processes, said reinforcing element (4) provides dimensional stability to the entire assembly, not only in the membrane electrode assembly (23) but also individually in each one of the passages for reagent gases, coolant fluid and, as the case may be, for clamping elements. Furthermore, this dimensional stability will be maintained during fuel cell operation since said reinforcing material (4) aids in absorbing the stresses generated in the membrane electrode assembly (23), mainly due to the proton exchange membrane (1), which is an element that tends to contract or expand easily according to its temperature levels and especially according to its humidity levels.

During the operation of a fuel cell with elastomeric gaskets and tightened with standard clamping elements for threaded joints, it is necessary to retighten them after a certain number of working hours, due to the effects on the gasket derived from constant compression together with a high temperature. Said effects comprise gasket straining, which causes a reduction of the thickness thereof, such that the compression between the stacked elements decreases. The reinforcing material integrated in the assembly (A) of the present invention contributes towards significantly improving this drawback. The fact of integrating the reinforcing material in the sealing structure of the assembly, surrounding the reagent gas and coolant fluid openings (10) for the passage of reagent gases and coolant fluid and, as the case may be, the first opening(s) (11) for the passage of clamping elements, and extending it to the outer contour of the assembly, as is described for the assembly (A) of the present invention, aids in retaining tightness of the cell assembly, significantly reducing the occurrence of the aforementioned effects and therefore improving the features of the membrane electrode assemblies existing in the state of the art.

If the first opening(s) (11) for the passage of clamping elements are integrated in the reinforcing material of the membrane electrode assembly, this improvement is further accentuated. When tightening, the assembly will be compressed between two separator plates, and since the areas subjected to greater stresses will be those surrounding the clamping elements, the arrangement of the sheet of reinforcing material (4) within the gasket, surrounding the bead sealing element(s) encircling the first opening(s) (11) for the passage of said clamping elements, will contribute in a positive manner towards maintaining the tightening force.

It must be stressed that although the drawings incorporated in the present document only describe an assembly with an octagonal shape, the assembly described in the invention is not limited to this geometric shape but comprises any other polygonal shape that may be suitable in the design of a fuel cell. In a particular embodiment the assembly has a square, rectangular or octagonal shape.

Another aspect of the present invention relates to a process for manufacturing a membrane electrode assembly (A) with a reinforced sealing structure such as that of the invention.

The first step in this process consists in providing the membrane electrode assembly (23). To that end, first the ion exchange membrane (1) and the anode (3A) and cathode (3C) porous gas diffusion layers are cut to the desired dimensions a×b. Although a and b may have different values, in a particular embodiment a is equal to b. The catalyst (2A, 2C) is then prepared, which catalyst is usually a catalytic ink prepared according to methods that have been widely described in the state of the art [Sasikumar, G. et al., *Electrochimica Acta* 2004, 50, 603]. Said ink consists in an aqueous suspension comprising catalytic particles dispersed in an electrolyte which, in general, is the same as that forming the ion exchange membrane. This suspension can also comprise alcohols, such as isopropanol and ethanol, or polyalcohols, such as ethylene glycol and glycerin. The same composition may be used for the anode and the cathode or a different ink composition may be used in each electrode. In a preferred embodiment of the invention, an aqueous suspension comprising platinum-on-carbon particles and dispersed in the liquid Nafion® and isopropanol ionomer is used for both electrodes.

The next step consists in depositing the prepared catalytic ink on the previously cut porous gas diffusion layers (3A, 3C), specifically on the side that will be in contact with the ion exchange membrane. If the porous gas diffusion layers comprise a microporous layer, the ink will be applied on said microporous layer. In order to perform this step, a mask of a rigid material is placed on each porous gas diffusion layer (3A, 3C), limiting the area on which the catalyst (2A, 2C) is applied to dimensions c×d (smaller than a×b), determining the active area of the assembly. Application of the ink can be performed by any method known in the state of the art, such as by means of application with a spray gun. Thus, the anode catalytic layer (2A) is applied to one porous gas diffusion layer (3A) and the cathode catalytic layer (2C) is applied to the other porous gas diffusion layer (3C). Finally, the ink is dried by any suitable method, such as for example by means of a heat source. Control of the amount of catalytic ink applied is carried out by weighing.

Once the catalyst (2A, 2C) is deposited on both porous gas diffusion layers (3A, 3C), said layers and the membrane (1) located between them are hot pressed, thus obtaining the unitary membrane electrode assembly (23).

In an alternative embodiment, the catalytic ink is applied on both sides of the membrane (1), instead of on the porous gas diffusion layers (3A, 3C). These layers (3A, 3C) together with the membrane (1) carrying both catalytic layers (2A, 2C) are then hot pressed, such that a membrane electrode assembly (23) is obtained with the same arrangement as that obtained in the previous embodiment.

A second step of the process for manufacturing the assembly of the invention is the cutting of the membrane electrode assembly (23) to the desired dimensions e×f such that a×b>e× f>c×d. The elements forming the assembly are thus perfectly aligned and cut with equal dimensions, such that both the electrode layers and the membrane are cut flush.

A third step would consist in providing a sheet of thickness comprised between 0.05 mm and 1 mm that will act as a reinforcing material (4). Said sheet is cut to the desired dimensions by any suitable cutting technique, for example by means of laser cutting, and a series of bores are made thereupon such that a central cavity is provided for positioning the membrane electrode assembly (24), the reagent gas and coolant fluid openings (10) for the passage of reagent gases and coolant fluid, the second opening(s) (16, 17) for the passage of sealing material during the subsequent injection and the hollow area(s) (18) for placing part of the bead sealing element(s) comprised in the gasket.

When the sealing structure comprises at least one first opening (11) intended for the passage of clamping elements, additional bore(s) are performed such that they provide said opening(s) (11).

Once the sheet is cut, a primer is applied thereupon which facilitates subsequent adhesion of the sealing material on the sheet.

A subsequent step would consist in placing the reinforcing material (4) inside an injection mold on which a demolding agent has been previously applied. Then the membrane electrode assembly (23) is also placed inside said mold, specifically in the central cavity (24) left by the reinforcing material (4) in the center thereof, centering it with the aid of a set of tools.

Once the membrane electrode assembly (23) and the reinforcing material (4) are placed inside the mold, in a subsequent step the sealing material that will provide the gasket integrated in the assembly (A) is injected. The injector can be of the vertical type, the injection being performed from above, such that the material flows from the injection points located in the mold until filling the cavity forming the mold. The injection points located in the mold are positioned on the opening(s) (16) and on certain hollow area(s) (18) for obtaining bead sealing element(s). The notches (22) facilitate the flow of the sealing material to the first attachment area (6) where the gasket attaches to the membrane electrode assembly (23), in order to achieve a controlled distribution of the sealing material in the gasket.

In an embodiment of the invention, at least one of the front sides of the reinforcing material (4) is completely coated in rubber. Optionally, both sides of the reinforcing material may also be coated. In order to achieve this, the injection mold will have suitable attachment cavities and points, such as could be defined by a person skilled in the art of injection molds.

The variables to be controlled during the injection process are mold vacuum, closing force, injection pressure, vulcanization or curing time, mold temperature, and they will depend in each case on the material to be injected, being easily determined by a person skilled in the art.

Finally, once the curing process of the sealing material has ended, the assembly is extracted from the mold and the excess fragments of sealing material are eliminated, obtaining the finished product.

The process described herein refers to the manufacture of a single assembly, however, it is a process that easily allows automation in order to achieve mass production.

Finally, the invention also refers to the use of an assembly such as the one described above for manufacturing a fuel cell or for manufacturing an electrolyzer.

The following example is given only as an illustration of the invention and must not in any case be interpreted as limiting the invention.

EXAMPLES OF THE INVENTION

Example 1

Preparation of a Membrane Electrode Assembly with a Reinforced Sealing Structure The first step for manufacturing this assembly is cutting of the carbon cloth, which forms the porous gas diffusion layers, and of the membrane. To this end two pieces of carbon cloth with a microporous layer on one of its sides have been cut to dimensions of 200×200 mm. Likewise, a piece of proton exchange membrane, specifically a Nafion® 112 membrane, is also cut with equal dimensions.

As a second step the catalytic ink is prepared by methods that have already been amply described in the state of the art. The same composition can be used for the anode and the cathode, or a different ink composition may be used for the anode and the cathode. The ink contains platinum-on-carbon, with 20% platinum, an ionomer in the form of a 5% by weight solution of Nafion® and isopropyl alcohol. To obtain the ink, these components are mixed and stirred using ultrasound.

Once the catalytic ink is prepared, it is placed on the two pieces of cloth cut in the first step, specifically on the side containing the microporous layer of the carbon cloth, by means of a known method such as spray gun application, and it is then dried with a heat source. Control of the amount applied is performed by weighing. A rigid mask is placed on the carbon cloth, limiting the area to which the catalyst will be applied to dimensions of 190×190 (surface that will constitute the active area). The anode catalytic layer is thus applied to one electrode and the cathode catalytic layer to the other one.

The next step consists in hot pressing the electrode layers containing the catalytic ink as well as the proton exchange membrane, obtaining the membrane electrode assembly. Said pressing is carried out by placing the catalytic layers in contact with the proton exchange membrane, applying a pressure of 75 Kp/cm$^2$ for 1 minute and at a temperature of 50° C.

Once the membrane electrode assembly is obtained, it is cut to dimensions of 195×195. The elements forming the membrane electrode assembly are thus perfectly aligned and cut with equal dimensions, such that both the carbon cloth and the membrane are cut flush.

On the other hand a stainless steel sheet of 0.30 mm thickness is taken and cut such as to obtain the regular octagonal-shaped reinforcing element with 120 mm per side, and a series of bores are made to form the openings intended for the passage of reagent gases, coolant fluid and clamping elements. Likewise, small bores are made on both sides of the steel sheet to facilitate the subsequent passage of the sealing material on both sides of the steel sheet and to provide the hollows in which part of the bead sealing elements of the gasket will be placed. Then, the already cut steel sheet is placed inside a mold for rubber injection.

The membrane electrode assembly is then placed inside the injection mold, centering it with the aid of a set of tools.

The next step consists in injecting the sealing material, in this case NBR nitrile rubber, using a vertical injector applying a vacuum cycle. The conditions for said injection are:

Closing force: 200 Ton
Injection pressure: 100 bar
Time: 15 minutes
Temperature: 100° C.

Finally, the already formed product consisting in a membrane electrode assembly with a sealing structure reinforced with the metal sheet is removed from the mold and the excess fragments of rubber are eliminated, thus obtaining the finished product.

Example 2

Testing a Fuel Cell With a Set of Membrane Electrode Assemblies With a Reinforced Sealing Structure A fuel cell is assembled by stacking 15 cells formed by membrane electrode assemblies such as the one described above. The active area in each cell is 190 mm×190 mm. The cell is tested using industrial grade hydrogen as fuel and ambient air as oxidizer. The hydrogen is fed through the dead-end system, which consists in keeping the cathode closed and venting with a certain frequency, in this case every 20 seconds. The air is supplied with a stoichiometric flow rate of 2.0. Pressures in the anode and cathode are 30 kPa, and the fuel cell stays at a temperature of 60° C. During the test a maximum power of 1625 W is obtained, with a voltage of 7.2 V, such that a power density of 300 mW/cm$^2$ is obtained.

The invention claimed is:

1. An assembly with a reinforced sealing structure comprising:
    a) a membrane electrode assembly having an outer contour;
    b) a sealing structure surrounding said membrane electrode assembly, comprising:
        i) a gasket comprising at least one bead sealing element, wherein the at least one bead sealing element completely covers the outer contour of the membrane electrode assembly and extends until covering the outer contour of the assembly, and wherein the at least one bead sealing element comprises a first, a second, and a third attachment area and a first and a second sealing area;
        ii) a reinforcing material integrated in said gasket that extends from the outer contour of the membrane electrode assembly to the outer contour of the assembly, in such a manner that the reinforcing material is embedded into the second and into the third attachment area of the bead sealing material of the gasket within limits of said attachment areas; and
        iii) reagent gas and coolant fluid openings for the passage of reagent gases and coolant fluid.

2. The assembly according to claim 1 wherein the bead sealing element(s) forming the gasket:
    a) cover the outer contour of the membrane electrode assembly;
    b) surround the reagent gas and coolant fluid openings for the passage of reagent gases and coolant fluid; and/or
    c) cover the outer contour of the assembly.

3. The assembly according to claim 2 wherein the bead sealing element covering the outer contour of the membrane electrode assembly comprises the following:
    a) a first attachment area wherein sealing material forming the bead sealing element enters the pores of the outer contour of the membrane electrode assembly;
    b) a stress dampening area adjacent to the first attachment area, wherein the sealing material forming the bead sealing element has a thickness less than that of the first attachment area;
    c) a first sealing area adjacent to the dampening area, wherein the sealing material forming the bead sealing element has a thickness that is greater than that of the first attachment area;
    d) a second attachment area, wherein the sealing material forming the bead sealing element envelops the reinforcing material and has a thickness that is less than that of the first sealing area; and optionally
    e) notches for facilitating the distribution of the sealing material forming the bead sealing element in the molding process.

4. The assembly according to claim 3 wherein the thickness of the first attachment area of the bead sealing element is in a range from 0.4 mm to 3 mm.

5. The assembly according to claim 3 wherein the thickness of the stress dampening area of the bead sealing element is in a range from 0.2 mm to 2 mm.

6. The assembly according to claim 3 wherein the thickness of the first sealing area of the bead sealing element is in a range from 0.8 mm to 5 mm.

7. The assembly according to claim 3 wherein the thickness of the second attachment area of the bead sealing element is in a range from 0.2 mm to 2 mm.

8. The assembly according to claim 2 wherein the bead sealing element surrounding the reagent gas and coolant fluid openings comprises the following:
    a) a third attachment area, wherein the sealing material forming the bead sealing element is attached to the reinforcing material; and
    b) a second sealing area adjacent to the third attachment area, wherein the sealing material forming the bead sealing element has a thickness that is greater than that of the third attachment area.

9. The assembly according to claim 8 wherein the thickness of the third attachment area of the bead sealing element is in a range from 0.2 mm to 2 mm.

10. The assembly according to claim 8 wherein the thickness of the second sealing area of the bead sealing element is in a range from 0.8 mm to 5 mm.

11. The assembly according to claim 1 wherein the membrane electrode assembly comprises:
    a) a cathode porous gas diffusion layer;
    b) an anode porous gas diffusion layer;
    c) an ion-exchange membrane interposed between the cathode porous gas diffusion layer and the anode porous gas diffusion layer;
    d) a cathode electrocatalyst layer arranged in the interface between said ion-exchanged membrane and said cathode porous gas diffusion layer; and
    e) an anode electrocatalyst layer arranged in the interface between said ion-exchanged membrane and said anode porous gas diffusion layer;
        wherein said electrocatalyst layers define an electrochemically active area.

12. The assembly according to claim 11 wherein the porous gas diffusion layers comprise a microporous layer.

13. The assembly according to claim 11 wherein the ion exchange membrane comprises a solid polymer electrolyte membrane.

14. The assembly according to claim 11 wherein the porous gas diffusion layers and the ion exchange membrane have the same dimensions.

15. The assembly according to claim 1 wherein the sealing structure further comprises at least a first opening for the passage of clamping elements.

16. The assembly according to claim 15 wherein the gasket further comprises a bead sealing element surrounding the first opening(s).

17. The assembly according to claim 1 wherein the gasket is formed of a polymeric material.

18. The assembly according to claim 17 wherein the polymeric material is an elastomer selected from the group consisting of nitrile rubbers, polyacrylic rubbers, fluorinated rubbers, silicone rubbers, silicones and liquid silicones.

19. The assembly according to claim 1 wherein the reinforcing material comprises:
   a) a central cavity for positioning the membrane electrode assembly; and
   b) reagent gas and coolant fluid openings for the passage of reagent gases and coolant fluid.

20. The assembly according to claim 19 wherein the reinforcing material further comprises at least one of the following:
   a) at least one second opening for the passage of the sealing material;
   b) at least one hollow area for placing part of the bead sealing element(s) in the gasket; and
   c) at least one bridge located between the hollow area(s) in which part of the bead sealing element(s) are located.

21. The assembly according to claim 19 wherein the reinforcing material further comprises the first opening(s) for the passage of clamping elements.

22. The assembly according to claim 1 wherein the reinforcing material comprises a polymeric material selected from the group consisting of composites with glass fiber, composites with boron fiber, composites with aramid fiber, phenolic resins and polycarbonate and metallic material.

23. The assembly according to claim 22 wherein the reinforcing material comprises a metallic material selected from the group consisting of stainless metallic material and stainless spring steel.

24. The assembly according to claim 1 wherein the thickness of the reinforcing material is in a range from 0.05 mm to 1 mm.

25. The assembly according to claim 24 wherein the thickness of the reinforcing material is in a range from 0.10 mm to 0.50 mm.

26. The assembly according to claim 1 wherein the reinforcing material is coated on at least one side with the sealing material forming the gasket.

27. The assembly according to claim 1 wherein the geometry of the assembly is a polygonal shape.

28. The assembly according to claim 27 wherein the geometry of the assembly is a square, rectangular or octagonal shape.

29. A fuel cell comprising a set of assemblies according to claim 1.

30. An electrolyzer comprising a set of assemblies according to claim 1.

31. Use of an assembly according to claim 1 in manufacturing a fuel cell.

32. Use of an assembly according to claim 1 in manufacturing an electrolyzer.

33. A process for manufacturing an assembly of the claim 1, said process comprising:
   a) providing a membrane electrode assembly;
   b) cutting the membrane electrode assembly to the desired dimensions;
   c) providing a sheet of reinforcing material and making openings therein for placing the membrane electrode assembly, for the passage of reagent gases and for the passage of coolant fluid;
   d) placing the sheet of reinforcing material inside an injection mold;
   e) placing the membrane electrode assembly inside the injection mold;
   f) injecting the sealing material in the mold; and
   g) extracting the assembly from the mold, wherein the assembly comprises:
      a) a membrane electrode assembly having an outer contour and
      b) a sealing structure surrounding said membrane electrode assembly, comprising:
         i) a gasket comprising at least one bead sealing element, wherein the at least one bead sealing element completely covers the outer contour of the membrane electrode assembly and extends until covering the outer contour of the assembly, and wherein the at least one bead sealing element comprises a first, a second, and a third attachment area and a first and a second sealing area:
         ii) a reinforcing material integrated in said gasket that extends from the outer contour of the membrane electrode assembly to the outer contour of the assembly in such a manner that the reinforcing material is embedded into the second and into the third attachment area of the bead sealing material of the gasket within limits of said attachment areas; and
         iii) reagent gas and coolant fluid openings for the passage of reagent gases and coolant fluid.

34. The process for manufacturing an assembly according to claim 33, further comprising making a second opening on the sheet of reinforcing material for passage of sealing material during the subsequent injection.

35. The process for manufacturing an assembly according to claim 33, further comprising making a first opening on the sheet of reinforcing material for passage of the clamping elements.

36. The process for manufacturing an assembly according to claim 33, further comprising a subsequent step of eliminating the excess sealing material from the assembly.

* * * * *

UNITED STATES PATENT AND TRADEMARK OFFICE
CERTIFICATE OF CORRECTION

| | | |
|---|---|---|
| PATENT NO. | : 7,862,950 B2 | Page 1 of 1 |
| APPLICATION NO. | : 11/279438 | |
| DATED | : January 4, 2011 | |
| INVENTOR(S) | : Pedro Sánchez Diaz | |

It is certified that error appears in the above-identified patent and that said Letters Patent is hereby corrected as shown below:

On the title page, please insert the Foreign Application Priority Data. It should read:

--February 24, 2006    (EP)    .............................. 06380036.1--

Signed and Sealed this
Fifteenth Day of March, 2011

David J. Kappos
*Director of the United States Patent and Trademark Office*